(No Model.)
F. L. PERRY.
TWO WHEELED VEHICLE.
No. 303,041. Patented Aug. 5, 1884.
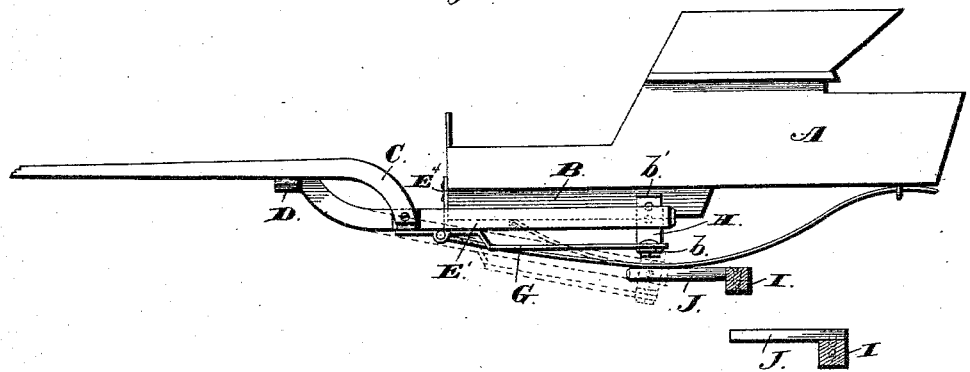
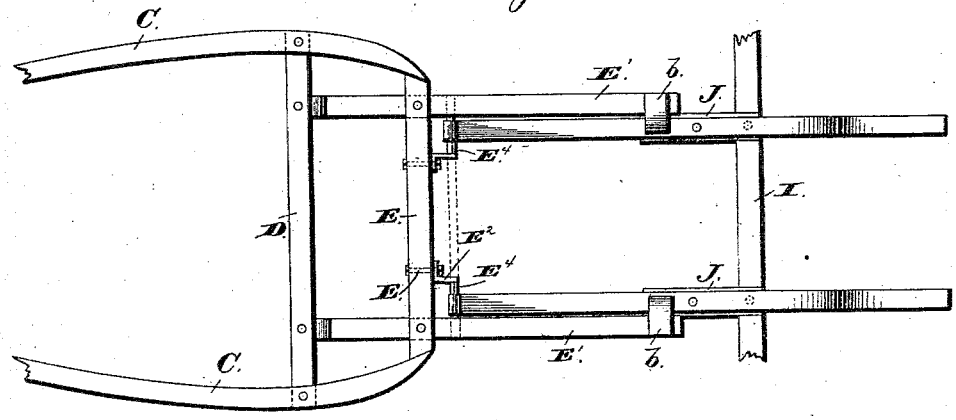
WITNESSES
Jas. E. Hutchinson
George F. Downing
INVENTOR
Francis L. Perry
By H. A. Symons
Attorney

UNITED STATES PATENT OFFICE.

FRANCIS L. PERRY, OF BRIDGEPORT, CONNECTICUT.

TWO-WHEELED VEHICLE.

SPECIFICATION forming part of Letters Patent No. 303,041, dated August 5, 1884.

Application filed February 8, 1884. (No model.)

*To all whom it may concern:*

Be it known that I, FRANCIS L. PERRY, of Bridgeport, in the county of Fairfield and State of Connecticut, have invented certain new and useful Improvements in Two-Wheeled Vehicles; and I do hereby declare the following to be a full, clear, and exact description of the invention, such as will enable others skilled in the art to which it appertains to make and use the same.

My invention relates to an improvement in two-wheeled vehicles, the object of the same being, first, to provide improved shafts for low-hung or narrow-body vehicles that will be cheap to manufacture, that will not interfere with the free access to and from the vehicles, and that will allow the horse to turn without interfering in the least with his movements. A further object is to provide means for yieldingly securing the shafts to the vehicle-body, whereby the vehicle-body is relieved of the unpleasant jolting motion of the horse. A further object is to provide means for securing the vehicle-springs to the axle and body; and with these ends in view my invention consists in the parts and combination of parts, as will be more fully described, and pointed out in the claims.

In the accompanying drawings, Figure 1 is a view in side elevation of a vehicle embodying my invention, the wheels being removed; and Fig. 2 is a plan view of same.

A represents a vehicle-body of any desired design, to the front end of body or frame B of which the shafts C are pivotally secured. These shafts C are constructed of two poles, so arranged relatively to each other that their rear ends incline downwardly and inwardly to enable them to be secured to the side beams or bars of the carriage-body without the aid of laterally-projecting arms. By causing the rear ends of the poles composing the shafts to converge, the space between the poles immediately in front of the cross-bar D is considerably increased, thereby enabling the horse to partly turn within the shafts without tripping or interfering in the least with his free movement. The rear ends of the poles composing the shafts are rigidly secured at their rear ends to the surface or sides of the cross-bar E, rigidly secured to the side bars, E', which latter are merely continuations or rearward extensions of the poles. These extensions are curved upwardly at their front ends, and terminate at the cross-bar D of the poles, and are secured together by the cross-bar D, to which latter the poles composing the shafts are also secured. Thus it will be seen that the shafts are rigidly secured to the side bars, E' and E', and all motions of the shafts are communicated to the said side bars. These side bars extend rearwardly alongside of the vehicle-body, and are pivotally secured thereto by the cranked rods $E^2$, one end of each of which is attached to the side bars, while the opposite ends are secured to the cross-bars E by the bolts $E^3$. To these crooked rods are secured the metallic plates $E^4$, one end of each of which is looped, the said looped ends being secured to the cranked brace-rods, while the remaining portions of said plates are provided with a series of perforations, by means of which the front ends of the vehicle-body are adjustably secured thereto. By means of these plates the poles can be adjusted up and down to keep the body level with either a light or heavy load.

Instead of employing the cranked rods, as shown, a straight rod, as shown in dotted lines, could be employed instead thereof. This arrangement also leaves the shafts free to vibrate without effecting or transmitting the motion thereof to the vehicle-body. To the under side of each of these side bars, E' and E', and near their front ends, are secured the flat springs G, which latter pass rearwardly under the bars, and are secured in any suitable manner at their rear ends to the lower projecting lip, *b*, of the bracket H. This bracket H is preferably made of metal, and is provided with a series of perforations, by means of which it is pivoted to the vehicle-body, and by which it can be adjusted up and down on the body or frame to which it is secured. By pivoting the brackets to the body or frame they are allowed a slight oscillating movement, which movement prevents the spring from straining. This bracket can, if desired, be adjustably secured to the forwardly-extending arm of the axle, as shown in dotted lines, when desired.

These brackets are also provided at their upper ends with the lips b', which latter limit the upward movement of the rear ends of the side bars, E' and E'. From the foregoing it will be seen that the jarring motion of the shafts, instead of being communicated to the vehicle-body, is taken up by the springs and the vehicle-body allowed to remain in approximately a horizontal position.

In vehicles of this character it is necessary to have the seat balanced over the axle to prevent the body from tilting either back or forth. It is also necessary to centrally seat the springs on said axle and secure the opposite ends of said springs to the vehicle-body respectively in front and rear of the axle. Now, unless the vehicle-body be extended rearwardly beyond the seat a sufficient distance to form an attachment for the spring, rearwardly-projecting arms or three-quarter elliptic springs have to be employed to enable the rear ends of the springs to be secured. These arms or the three-quarter elliptic springs add considerable to the cost of a vehicle, and the object of this part of my invention is to provide an improved construction whereby I am enabled to use a semi-elliptic spring, secure it centrally, so that the weight will fall directly on the axle, and still be able to secure both ends to the under side of the body without increasing the length of said body or employing the rearwardly-extending arms. This is accomplished by providing the axle I with forwardly-extending arms J, which can be welded, clipped, or otherwise secured to the axle, and centrally seating the springs on these arms. These arms J are of sufficient length to enable the spring to be secured to the under side of the body without projecting rearwardly therefrom, and also to form a seat for the said springs. By this arrangement the greater portion of the springs is in front of the axle, but the strain is transmitted to the axle precisely the same as it would be if the axle were directly under the center of the spring. The front ends of the springs are secured to the under side of the body by any suitable means or to the cranked rods, as shown, while their rear ends pass through clips and have longitudinal sliding movement therein. If desired, I can employ three-quarter elliptic springs or half platform-springs; but the semi-elliptic springs shown answer all the necessary purposes.

It is evident that slight changes in the construction and arrangement of the several parts might be resorted to without departing from the spirit of my invention, and hence I would have it understood that I do not confine myself to the exact construction shown and described, but consider myself at liberty to make such changes as fairly fall within the spirit and scope of my invention.

Having fully described my invention, what I claim as new, and desire to secure by Letters Patent, is—

1. The combination, with a vehicle-body, side bars pivotally secured to said body, and provided with upwardly-curved front ends, and a cross-bar secured to said upwardly-curved ends, of the poles turned or twisted as described, and secured to the cross-bar and side bars.

2. The combination, with a vehicle-body, of the side and cross bars pivotally secured to said body, and provided with upwardly-curved ends, the cross-bar rigidly secured to said upwardly-curved ends, shaft-poles secured to said cross-bar and to the side bars, and springs connected to said body or frame and side bars.

3. The combination, with a vehicle-body, of the side bars, shafts secured to the side bars, the flat springs, and the adjustable oscillating bracket provided at its upper end with an outwardly-projecting lip, substantially as set forth.

4. The combination, with an axle provided with forwardly-extending rigid arms, and a vehicle-body situated above said arms, of springs secured on the arms and supporting the vehicle-body, substantially as set forth.

5. The combination, with a vehicle-body, of an axle provided with forwardly-extending arms and semi-elliptic springs centrally secured to said arms, the opposite ends of said springs being secured to the lower side of the carriage body, substantially in the manner set forth.

6. The combination, with a body or frame, of the shafts, side bars, cross-bars secured to the side bars, the cranked rod, and plates connecting the rod and vehicle-body.

7. The combination, with a body or frame, of the shafts, side bars, cross-bars connecting the shafts and side bars, the cranked rods, and plates pivotally secured to said rods and provided with perforations, whereby the carriage-body can be adjustably secured thereto, substantially as set forth.

8. The combination of shafts, cross-bar, crooked cross-bar brace, and suspension-plate, shaft-springs, and rear spring-bracket, substantially as set forth.

9. The combination, with a body and shafts, the latter connected to the body by the cranked rod and suspension-plate, of the main springs seated on the forwardly-projecting arms of the axle, and connected at their rear ends to the vehicle-body and at their forward ends to the cranked rods, substantially as set forth.

In testimony whereof I have signed this specification in the presence of two subscribing witnesses.

FRANCIS L. PERRY.

Witnesses:
GEO. F. DOWNING,
S. G. NOTTINGHAM.